United States Patent
Juneja et al.

(10) Patent No.: US 9,917,668 B2
(45) Date of Patent: Mar. 13, 2018

(54) SYSTEMS AND METHODS FOR DETECTING AND PROPAGATING RESIZABILITY INFORMATION OF ODUFLEX CONNECTIONS

(71) Applicants: Kapil Juneja, Gurgaon (IN); Pallavi Tuli, New Delhi (IN); Jatin Sareen, New Delhi (IN); Waseem Reyaz Khan, Gurgaon (IN); Rajagopalan Kannan, Gurgaon (IN)

(72) Inventors: Kapil Juneja, Gurgaon (IN); Pallavi Tuli, New Delhi (IN); Jatin Sareen, New Delhi (IN); Waseem Reyaz Khan, Gurgaon (IN); Rajagopalan Kannan, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 232 days.

(21) Appl. No.: 14/341,037

(22) Filed: Jul. 25, 2014

(65) Prior Publication Data
US 2015/0365739 A1 Dec. 17, 2015

(30) Foreign Application Priority Data
Jun. 13, 2014 (IN) .......................... 1606/DEL/2014

(51) Int. Cl.
*H04J 3/16* (2006.01)
*H04L 12/721* (2013.01)
*H04Q 11/00* (2006.01)

(52) U.S. Cl.
CPC ....... *H04J 3/1652* (2013.01); *H04J 2203/006* (2013.01); *H04L 45/62* (2013.01); *H04Q 11/0062* (2013.01)

(58) Field of Classification Search
CPC ........ H04J 3/1652–3/167; H04J 3/1694; H04J 14/021–14/0212; H04J 14/0223; H04J 14/0272–14/0276; H04L 45/62; H04Q 11/0062–11/0067
See application file for complete search history.

(56) References Cited

U.S. PATENT DOCUMENTS

| | | | | |
|---|---|---|---|---|
| 2013/0259484 A1* | 10/2013 | Kawahara | ............... | H04J 14/08 398/98 |
| 2014/0079402 A1* | 3/2014 | Sharma | ................... | H04J 14/08 398/98 |
| 2016/0028474 A1* | 1/2016 | Rahn | ........................ | H04J 3/14 398/5 |

OTHER PUBLICATIONS

"Architecture for the automatically switched optical network (ASON)," International Telecommunication Union, Jun. 2006, pp. 1-104.

* cited by examiner

*Primary Examiner* — Eric Myers
(74) *Attorney, Agent, or Firm* — Clements Bernard Walker PLLC; Christopher L. Bernard; Lawrence A. Baratta, Jr.

(57) ABSTRACT

A method, in a network element, for detecting and propagating resizability information of an Optical channel Data Unit flex (ODUflex) connection includes receiving resizability information in overhead associated with the ODUflex connection, wherein the resizability information indicates a number of available tributary slots and whether the ODUflex connection is symmetric; and adjusting the resizability information based on a change in the available tributary slots due to a bandwidth change at the network element. The systems and methods include a solution to communicate, in real time, the resizability information of an ODUflex connection utilizing the associated data path to carry it instead of the management/control plane.

13 Claims, 7 Drawing Sheets

SYSTEMS AND METHODS FOR DETECTING AND PROPAGATING RESIZABILITY INFORMATION OF ODUFLEX CONNECTIONS

FIELD OF THE DISCLOSURE

The present disclosure relates generally to networking systems and methods. More particularly, the present disclosure relates to systems and methods for detecting and propagating resizability information of Optical channel Data Unit-flex (ODUflex) connections.

BACKGROUND OF THE DISCLOSURE

ITU-T Recommendation G.7044/Y.1347 (10/11) "Hitless adjustment of ODUflex (GFP)" (henceforth referred to as G.HAO), the contents of which are incorporated by reference herein, is a resizing mechanism within Optical Transport Network (OTN) that supports an increase or decrease of an ODUflex (GFP) client data rate across its entire end-to-end path. Since the ODUflex gets carried across the links as a single switched payload unit and not as individual units (unlike Virtual Concatenation (VCAT)), the following are prerequisites for supporting hitless resize of ODUflex (GFP): 1. All nodes in the path support G.HAO protocol; 2. The ODUflex occupies same number of tributary slots (TS) in a High Order (HO) Optical channel Path Unit-k (OPUk) for all links in the path, i.e., there are no asymmetric configurations; and 3. All links in the path have the bandwidth (i.e., number of TSs) available to resize the ODUflex to the desired rate.

However, conventionally, the resizability information (i.e., 1. whether symmetric or not; and 2. number of available TSs for hitless bandwidth increase which are constrained by the link with minimum available TSs along the connection path) is not available at the ODUflex (GFP) resizing control points (which could be the ODUflex client originating and terminating Connection Termination Points (CTPs) or the originating/terminating Subnetwork Connection (SNC) endpoints, for example) for the operator to make an informed choice on how much the ODUflex connection can resize hitlessly. Operators, therefore, have to attempt a trial and error mechanism before the hitless resizing succeeds. In case of manual cross-connects or mixed cross-connect/control plane connections, the framework to distribute the resizability information to ingress/egress client endpoints would be very tedious involving many control/management planes talking to each other. Even though this information is available to a distributed control plane on each intermediate node in cases of path setup through the control plane, the same is not communicated to the originating or terminating endpoints. In both the scenarios, however, the information cannot be communicated in real-time, i.e., as and when the bandwidth on any link along the path changes, but would involve software and communication delays.

There is no mechanism proposed in G.HAO to get the resizability information across a complete path. Any control plane-based solution has/would have the various limitations. It can only advertise the resizability information (bandwidth available and whether resizable) if the complete end-to-end ODUflex (GFP) path is setup by the control plane and is not a generic solution for mixed control-plane/management plane (manual cross-connect) paths or only manual cross-connect paths. It is not real-time due to distributed nature of software and software delays in propagating the information.

BRIEF SUMMARY OF THE DISCLOSURE

In an exemplary embodiment, a method, in a network element, for detecting and propagating resizability information of an Optical channel Data Unit flex (ODUflex) connection includes receiving resizability information in overhead associated with the ODUflex connection, wherein the resizability information indicates a number of available tributary slots and whether the ODUflex connection is symmetric; and adjusting the resizability information based on a change in the available tributary slots, due to a bandwidth change at the network element. The resizability information can be monitored, at a client endpoint, to determine how much and whether the ODUflex connection can resize. The resizability information can be included in Resize Control Overhead (RCOH) in the overhead. The resizability information can be included in reserved bits of the RCOH. The number of available tributary slots is a lowest number of available tributary slots along a path of the ODUflex connection. The resizability information can indicate a number of tributary slots supported at the network element and preceding network elements, such that subsequent network elements can determine if the ODUflex connection has an equal or greater number of tributary slots, and, if not, the resizability information is adjusted accordingly.

The method can further include adjusting the resizability information when a new Receive Multiplex Structure Identifier (MSI) is received responsive to a hardware interrupt or software poll. The method can further include transmitting the resizability information in real time in the ODUflex path overhead instead of through a control plane to eliminate delays in communicating the resizability information to client endpoint network elements. The resizability information can be set to DEFAULT at an originating network element for the ODUflex connection, VALID with the number of available tributary slots which is a minimum of available bandwidth over all network elements in which the ODUflex connection traverses, or INVALID when the ODUflex connection is not symmetric. The method can further include checking the resizability information to determine if the number of available time slots from a preceding network element is greater than a number of tributary slots available locally at the network element, and if so, changing the resizability information to reflect the lower number of available tributary slots available locally; and checking if the ODUflex connection is symmetric, and if not, changing the resizability information to reflect that the ODUflex connection is not symmetric. The method can further include updating the resizability information whenever any link associated with the ODUflex connection has a change in bandwidth. At a client endpoint of the ODUflex connection, a hitless increase of the ODUflex connection can be allowed or disallowed based on the resizability information.

In another exemplary embodiment, a network element includes at least one port with a High Order (HO) Optical channel Data Unit (ODU) with an ODUflex thereon; and a controller configured to: if the network element is an endpoint of the ODUflex, set resizability information in overhead of the ODUflex to a default value; and, if the network element is an intermediate point for the ODUflex, read the resizability information in the overhead and adjust its values based on local information related to a number of available tributary slots and whether the ODUflex is symmetric. The resizability information can be located in Resize Control Overhead (RCOH) in reserved bits. The controller can be configured to: adjust the resizability information when a new Receive Multiplex Structure Identifier (MSI) is received responsive to a hardware interrupt or software poll.

In yet another exemplary embodiment, a network includes a plurality of network elements; a plurality of links interconnecting the network elements; and at least one Optical channel Data Unit flex (ODUflex) on a path over links between two endpoints of the plurality of network elements; wherein resizability information is included in overhead associated with the ODUflex; wherein the resizability information indicates a number of available tributary slots for resizing and whether the ODUflex connection is symmetric; and wherein the resizability information is adjusted based on a change on the bandwidth available on the ODUflex connection path concurrently with the change on the connection map on any link along the path. The network can further include a control plane; wherein the resizability information is communicated in real time through Resize Control Overhead (RCOH) associated with the ODUflex and communicated to the control plane. The resizability information can be set to DEFAULT at an originating network element for the ODUflex connection, VALID with the number of available tributary slots which is a minimum of all links in the path, or INVALID when the ODUflex connection is not symmetric. Any of the network elements can be configured to adjust the resizability information when a new Receive Multiplex Structure Identifier (MSI) is received responsive to a hardware interrupt or software poll. The hitless adjustment can utilize G.7044/Y.1347 (10/11) "Hitless adjustment of ODUflex (GFP)" (G.HAO), and wherein the ODUflex connection can support the hitless adjustment if the ODUflex connection has an equal number of tributary slots on all links.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods are described for detecting and propagating resizability information of ODUflex connections. The systems and methods include a generic solution to communicate in real time, the resizability information of an ODUflex connection utilizing the associated data path to carry it with almost no involvement of the management/control plane. The resizability info can be propagated with the help of following parameters: 1) FREE_TS which is a number of TSs available for resizing along the ODUflex data path; and 2) CUR_TS which is used to compute whether the ODUflex connection is symmetric ODUflex data path and can be resized as per G.HAO. The systems and methods provide a unique mechanism to advertise resizability of an ODUflex (GFP) connection at the client endpoints, providing information for whether the connection can be resized, and if yes, by how much. The resizability of the ODUflex connection is maintained in real time, i.e., any time a particular link in the ODUflex connection path has an existing connection addition/deletion leading to link bandwidth decrease or increase, the same is used to update the resizability info in real time. The resizability information can be used by an operator to make informed decisions about resizing an ODUflex (GFP) connection to avoid any unsupported attempts, i.e., elimination of trial and error. Also, the resizability information can be used by a control/management plane to decide to reject any hitless auto resize attempts as well as deciding to raise an alarm.

Exemplary Network

Figure 1:
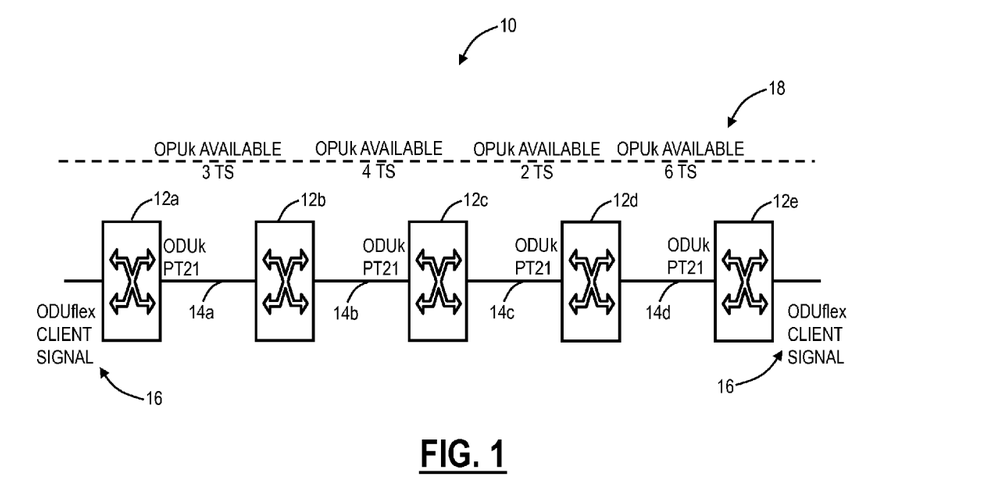
FIG. 1 is a network diagram of a network of interconnected network elements.

Referring to FIG. 1, in an exemplary embodiment, a network diagram illustrates a network 10 of interconnected network elements 12 (including network elements 12a-12e). The network elements 12 are interconnected by links 14 (including links 14a-14d) which include OTN connections. The network elements 12 can include, without limitation, optical switches, routers, add/drop multiplexers, packet-optical transport systems (POTS), multi-service provisioning platforms (MSPPs), Dense Wave Division Multiplexing (DWDM) platforms, and the like. The network 10 is shown as a linear configuration for illustration purposes of an ODUflex connection thereon. However, the systems and methods contemplate any type of network including mesh, rings, etc. where ODUflex connections are included and can have multiple hops (i.e., intermediate network elements 12) between origination and termination. In the example of FIG. 1, assume there is an ODUflex connection 16 originating at the network element 12a and terminating at the network element 12e.

The links 14 include High Order (HO) ODU connections carrying ODUflex connections of Payload Type (PT) 21 which is an ODU multiplex structure supporting Optical channel Data Tributary Units (ODTUs). The ODTUs can include ODTUk.ts or OTDUjk. The ODTUk.ts ((k,ts)= (2,1 ... 8), (3,1 ... 32), (4,1 ... 80)) in which a lower order ODU (ODU0, ODU1, ODU2, ODU2e, ODU3, and ODUflex) signal is mapped via the Generic Mapping Procedure (GMP), as defined in Section 19.6 of [G.709-2012]. The ODTUjk ((j,k)={(0,1), (1,2), (1,3), (2,3)}; ODTU01, ODTU12, ODTU13, and ODTU23) in which an ODUj signal is mapped via the Asynchronous Mapping Procedure (AMP), as defined in Section 19.5 of [G.709-2012]. The systems and methods described herein contemplate ODUflex connections mapped inside HO ODU2 with 1 to 8 TSs, HO ODU3 with 1 to 32 TSs, and HO ODU4 with 1 to 80 TSs.

ODUflex connections can be subnetwork connections (SNCs) (or also a label switched paths (LSP)) that traverse multiple network nodes and links from source to destination. Resizing of the ODUflex connections is constrained in ability to increase size in bandwidth hitlessly only by the available free tributary slots on the path (using G.HAO). ODUflex (GFP) HAO (Hitless Adjustment of ODUflex) is a resizing mechanism within OTN that allows it to support an increase or decrease of ODUflex (GFP) client data rate across its entire end-to-end path. The following pre-conditions exist for hitless re-adjustment: I. all nodes in the connection must support the HAO protocol, otherwise, the connection requires tear down and rebuilding; II. The ODUflex is a single managed entity rather than containing separate managed entities (ODUflex CTP); III. The bit rate adjustment of the ODUflex (GFP) occurs simultaneously among all the nodes in the ODUflex (GFP) connection to prevent buffer overflow or underflow; and IV. A resizable ODUflex (GFP) occupies the same number of tributary slots on every link of the path (i.e., is symmetric). In cases of bandwidth adjustment (i.e., increase or decrease), the same number of tributary slots (at least one TS) on each link traversed by the resized ODUflex (GFP) must be involved. In simple terms, HAO is a replacement for Virtual Concatenation (VCAT), which involved routing bandwidth through the network along different physical paths necessitating differential delay compensation. ODUflex removes the constraint but imposes the constraint of routing of all TSs on the same physical route.

In the network 10, the ODUflex connection 16 can be an ODUflex (GFP) client multiplexed or mapped inside an HO ODUk (PT21) that traverses the four links 14a-14d before being dropped at the client end at the network element 12e. FIG. 1 includes data 18 listed above the links 14 indicating a number of free tributary timeslots (ODU0 tributaries) available at each of the links 14 along the path. Based on the data 18, the ODUflex connection 16 can increase hitlessly its bandwidth by up to 2 tributary slots only since the link 14c sets this limit as the lowest available TSs. As such, the systems and methods described herein propose to communicate this resizability information in real time within overhead of the ODUflex connection 16. When this resizability information changes based on bandwidth changes on the links 14, the resizability information is adjusted at the same time as the bandwidth changes and communicated in the overhead.

OPUk Overhead and Resize Control Overhead (RCOH)

Figure 2:
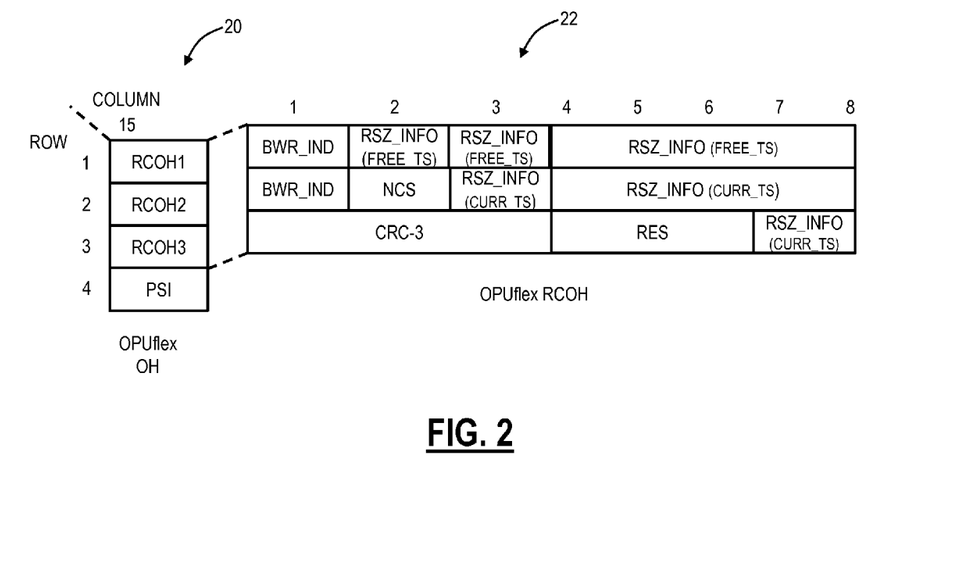
FIG. 2 is a block diagram of Optical channel Path Unit j (OPUj/OPUflex) overhead.

Referring to FIG. 2, in an exemplary embodiment, a block diagram illustrates OPUk overhead 20. The OPUk overhead 20 is located in column 15 and rows 1-4 of ODUk overhead and includes three Resize Control Overhead (RCOH) bytes in rows 1-3 and a Payload Structure Identifier (PSI) in row 4. RCOH Overhead 22 illustrates details of the RCOH bytes. Synchronization of changes in the capacity of an ODUflex (GFP) connection is achieved by the RCOH. Changes are sent in advance so that the receiver can switch to the new configuration as soon as it arrives. The RCOH is carried in the HO OPUk tributary slot overhead (TSOH) and the OPUflex overhead as shown in FIG. 2. These RCOH (RCOH1, RCOH2 and RCOH3) bytes are located in column 15, row 1, 2 and 3. The HO OPUk RCOH is carried in the tributary slot which is to be added or to be removed. If multiple tributary slots are involved in one resize operation, the protocol is carried in all of these TS RCOHs to be added or to be removed. The RCOHs of these TSs involved in the same resize operation are always the same and transmitted identically.

The RCOH is divided into two parts: link connection resize (LCR) protocol overhead and bandwidth resize (BWR) protocol overhead. The LCR protocol overhead includes the control (CTRL) field, tributary port ID (TPID) field and tributary slot group status (TSGS) bit. The BWR protocol overhead includes the network connectivity status (NCS) bit, tributary slot connectivity check (TSCC) bit, resizing protocol indicator (RP) bit and bandwidth resize indicator (BWR_IND) bit. The LCR protocol bits, the RP bit and the TSCC bit in the BWR protocol are carried in HO OPUk (k=2, 3, 4) tributary slot overhead, and the NCS bit and BWR_IND bit in the BWR protocol are carried in the OPUflex overhead.

Conventionally, bits 2-8 in the RCOH1, bits 3-8 in the RCOH2, and bits 4-8 in the RCOH3 are reserved (RES) bits for future international standardization. In the systems and methods described herein, these RES bits are used to carry the resizability information (RSZ_INFO). For example, in an exemplary embodiment, bits 2-8 in the RCOH1, bits 3-8 in the RCOH2, and bit 8 in the RCOH3 are used for the RSZ_INFO to carry FREE_TS and CUR_TS. Since the OPUflex RCOH is generated/terminated at the client endpoints where the signal is mapped into ODUFlex (GFP), using the reserved bytes in the OPUflex RCOH to carry this information enables it to be available in real time to the client endpoints. The resizability information (RSZ_INFO) includes a number of TSs available for hitless bandwidth increase along the ODUflex connection data path (FREE_TS) and whether the ODUflex connection is symmetric and can be resized per G.HAO (CUR_TS), RSZ_INFO(FREE_TS, CUR_TS), i.e. symmetric meaning it can support hitless readjustment.

The OPUflex RCOH is generated at the client endpoints. Here, the RSZ_INFO is initialized to DEFAULT. At every ODUk PT21 Link endpoint, the unallocated TS information is extracted from the HO OPUk overhead Multiplex Structure Identifier (MSI) bytes and the same is compared against the RSZ_INFO(FREE_TS) present in the OPUflex RCOH of all the ODUflex connections on this link. If the value in OPUflex RCOH is DEFAULT (immediate next hop link from client endpoint) or greater than the value of unallocated timeslots on the current link and not INVALID (meaning asymmetric connection as explained below), it is reset to number of unallocated (available) timeslots on the current link to indicate that the current link sets the constraint on available bandwidth (# tributary slots) in the ODUflex data path, else it is not touched. This is decoded at the remote client endpoints for display to user or consumed by management/control plane. Also for each link on the path, the number of time slots to carry each ODUflex connection traversing on the link (identified with a unique tributary port number, TPN) is evaluated and this information is also compared with the RSZ_INFO(CUR_TS) in the OPUflex RCOH, if the RSZ_INFO(CUR_TS) in the OPUflex is not matching (and not DEFAULT), it is an asymmetric connection and cannot be resized, therefore the RSZ_INFO(FREE_TS) is set to INVALID to indicate no resizability.

In an exemplary embodiment, a total 14 of reserved bits in the RCOH are used as RSZ_INFO, 7 bits of RSZ_INFO are designated for the FREE_TS (indicating number of free tributary slots available in the ODUflex path) and another 7 bits as CURR_TS (indicating the number of tributary slots used for this connection, if CURR_TS is not the same for each link, then the ODUflex connection is not symmetric and cannot be resized). The RSZ_INFO in general can use any of the available RES bits, but is shown in FIG. 2 for an exemplary embodiment. With 7 bits for each, the following are the ranges of valid values for RSZ_INFO(FREE_TS, CUR_TS):

| Setting | Value |
|---|---|
| DEFAULT | 0x7E (127) |
| INVALID (Resizing Not Supported) | 0x7F (128) |
| VALID | 0 . . . 79 |

The DEFAULT setting can be set for both FREE_TS and CUR_TS, the INVALID setting is set for CUR_TS meaning a non-symmetric ODUflex connection, and the valid setting can be set between 0-79 for up to 80 TSs (i.e., supporting 80 TSs such as in an ODU4). Note, these values can be adjusted and more bits can be used in the OPUflex overhead.

Exemplary Operation of Resizability Information Propagation

Figure 3:
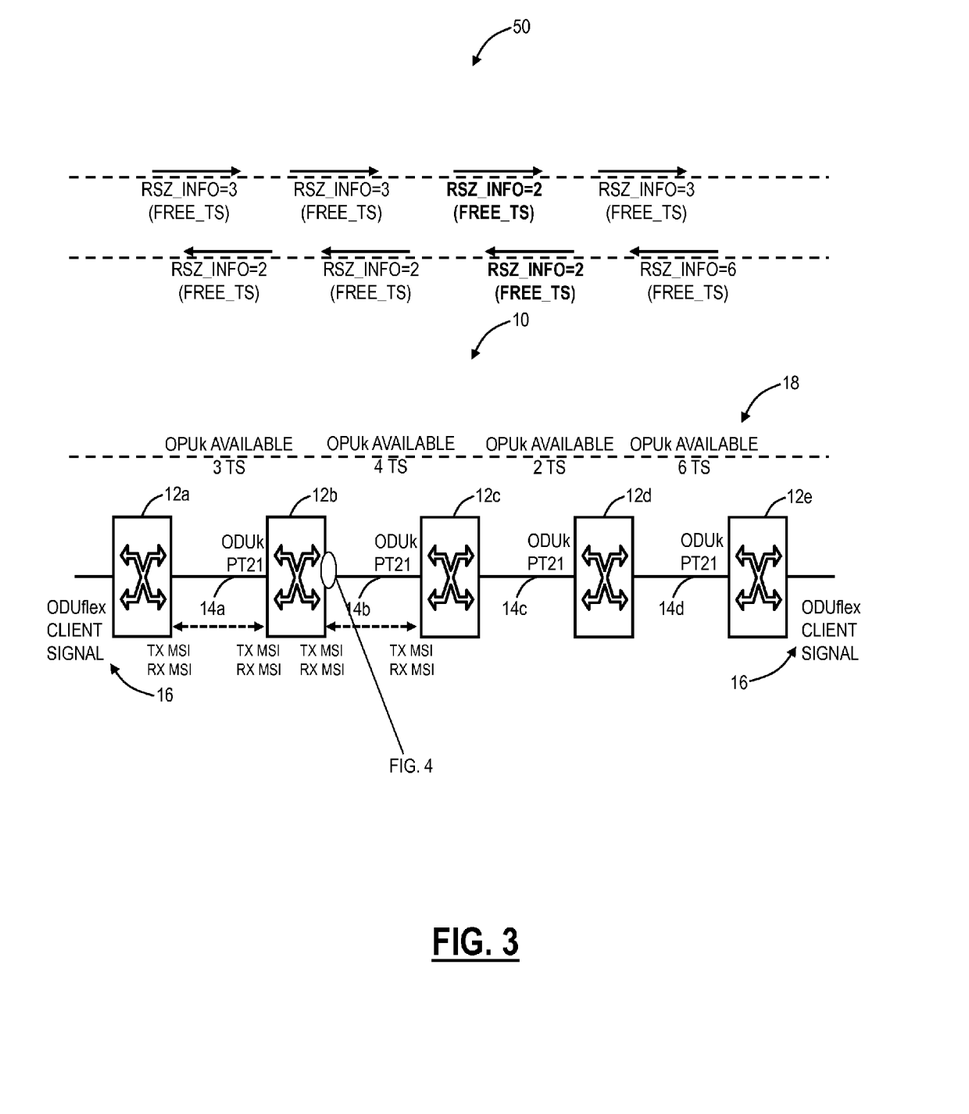
FIG. 3 is a network diagram of an operation of resizability information propagation via the Resize Control Overhead (RCOH) in the network of FIG. 1.
Figure 4:
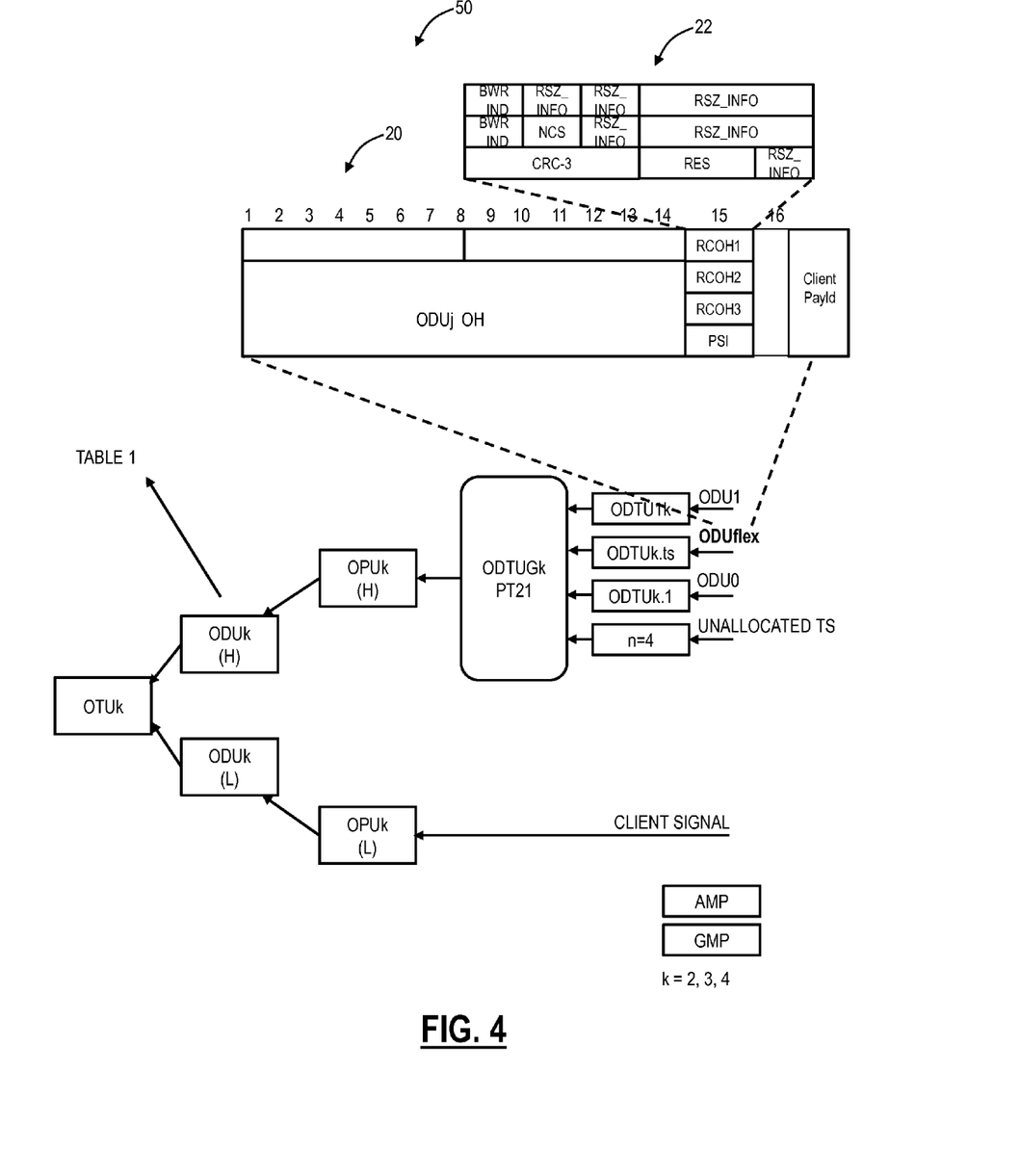
FIG. 4 is a logical diagram of the operation of FIG. 3.

Referring to FIGS. 3 and 4, in an exemplary embodiment, a network and a logical diagram illustrate an operation 50 of resizability information propagation via the RCOH overhead 22 in the network 10. FIG. 3 illustrates the network 10 along with resizability information 30 propagated in the OPUk overhead 20. FIG. 4 illustrate a logical diagram of the operation 50 at the network element 12b on the link 14b. In FIG. 3, the network 10 is as described in FIG. 1 and includes the data 18 listed above the links 14 indicating a number of free tributary timeslots (ODU0 tributaries) available on each of the links 14.

In FIG. 3, from west to east (the network element 12a to the network element 12e), the ODUflex connection 16 is created at the network element 12a, and there are 3 TSs available on the link 14a, so the operation 50 propagates RSZ_INFO(FREE_TS)=3 in the RCOH overhead 22. At the network element 12b, the RCOH overhead 22 is received with the RSZ_INFO(FREE_TS)=3 and it checks and there are 4 TSs available on the link 14b. However, since 3 TSs is less than 4 TSs, the network element 12b does not modify the RSZ_INFO(FREE_TS)=3 in the RCOH overhead 22. At the network element 12c, the RCOH overhead 22 is received with the RSZ_INFO(FREE_TS)=3 and it checks and there are 2 TSs available on the link 14c. Since 2 TSs is less than 3 TSs, the network element 12c modifies the RSZ_INFO (FREE_TS)=2 in the RCOH overhead 22. At the network element 12d, the RCOH overhead 22 is received with the RSZ_INFO(FREE_TS)=2 and it checks and there are 6 TSs available on the link 14d. However, since 2 TSs is less than 6 TSs, the network element 12d does not modify the RSZ_INFO(FREE_TS)=2 in the RCOH overhead 22.

In FIG. 3, from east to west (the network element 12e to the network element 12a), the ODUflex connection 16 is transmitted at the network element 12e, and there are 6 TSs available on the link 14d, so the operation 50 propagates RSZ_INFO(FREE_TS)=6 in the RCOH overhead 22. At the network element 12d, the RCOH overhead 22 is received with the RSZ_INFO(FREE_TS)=6 and it checks and there are 2 TSs available on the link 14c. Since 2 TSs is less than 6 TSs, the network element 12d modifies the RSZ_INFO (FREE_TS)=2 in the RCOH overhead 22. At the network element 12c, the RCOH overhead 22 is received with the RSZ_INFO(FREE_TS)=2 and it checks and there are 4 TSs available on the link 14b. However, since 2 TSs is less than 4 TSs, the network element 12c does not modify the RSZ_INFO(FREE_TS)=2 in the RCOH overhead 22. At the network element 12b, the RCOH overhead 22 is received with the RSZ_INFO(FREE_TS)=2 and it checks and there are 3 TSs available on the link 14a. However, since 2 TSs is less than 3 TSs, the network element 12b does not modify the RSZ_INFO(FREE_TS)=2 in the RCOH overhead 22.

Again, FIG. 4 is a logical diagram of the operation 50 at the network element 12b on the link 14b. Here, the ODUflex connection 16 is multiplexed into an ODTUGk PT 21 into an OPUk and into a HO ODUk. The following Table 1 illustrates exemplary MSI data associated with the HO ODUk. Note, from this table, the operation 50 determines there are 4 TSs on the link 14b—from the four unallocated TSs in the below Table 1.

TABLE 1

| TS | Ex. MSI code | Ex ODTU Type | Ex Trib port | Rx MSI code | Rx ODTU Type | Rx Trib port |
|---|---|---|---|---|---|---|
| 1 | 11000000 | unallocated |   | 11000000 | unallocated |   |
| 2 | 11000000 | unallocated |   | 11000000 | unallocated |   |
| 3 | 10000001 | ODTUk_ts | 2 | 10000001 | ODTUk_ts | 2 |
| 4 | 00000011 | ODTUFk | 4 | 00000011 | ODTUFk | 4 |
| 5 | 00000011 | ODTUFk | 4 | 00000011 | ODTUFk | 4 |
| 6 | 11000000 | unallocated |   | 11000000 | unallocated |   |
| 7 | 11000000 | unallocated |   | 11000000 | unallocated |   |

OPUflex RCOH Processing at Client Source/Sink

Figure 5:
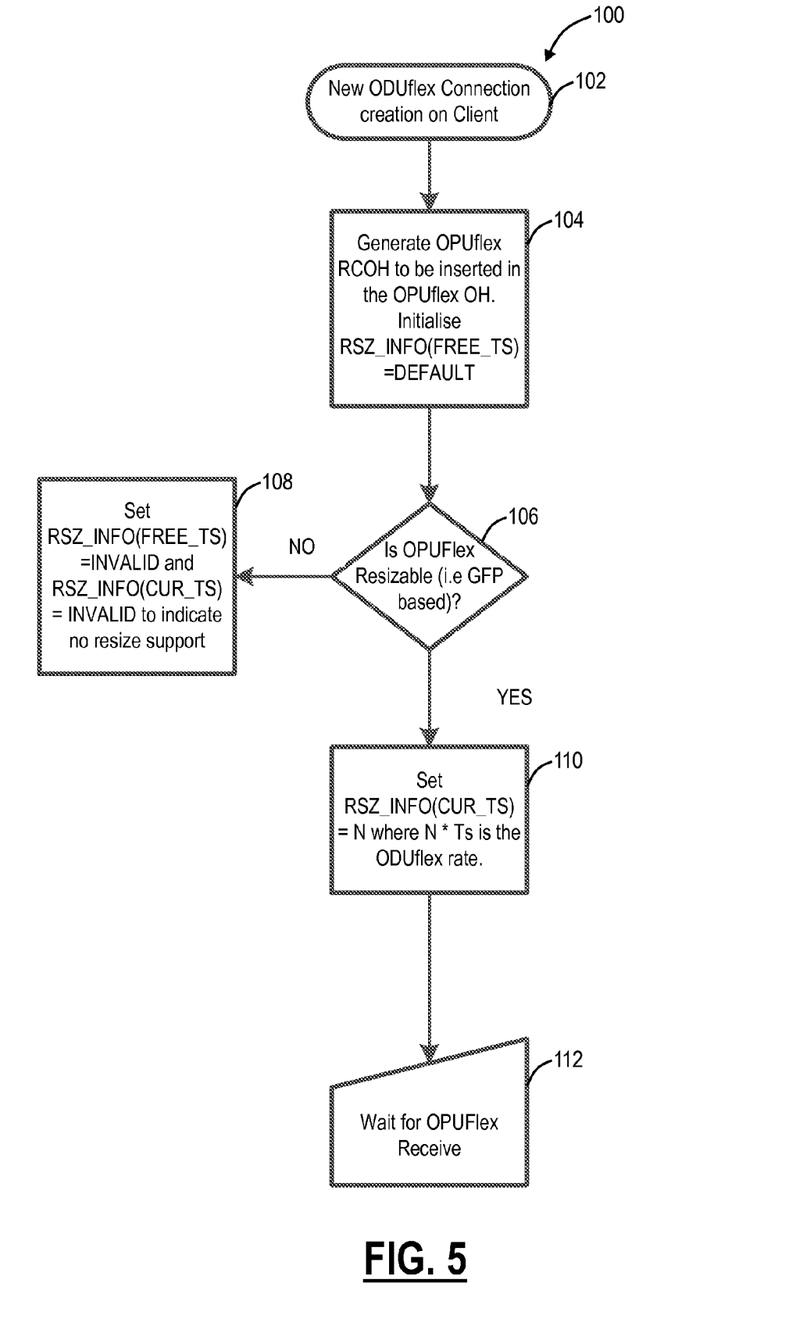
FIG. 5 is a flowchart of an OPUflex resizability processing method at client source/sink network elements for creating a new ODUflex connection.

Referring to FIG. 5, in an exemplary embodiment, a flowchart illustrates an OPUflex RCOH processing method 100 at client source/sink network elements for creating a new ODUflex connection. The OPUflex RCOH processing method 100 contemplates operation at the network elements 12, such as at the network element 12a for the ODUflex connection 16. The OPUflex RCOH processing method 100 includes a new ODUflex connection being created on a client (step 102). The trigger to update RCOH overhead 22 at the client endpoint is the creation of an ODUFlex (GFP) Connection. At the network element 12, the RCOH information is inserted along with standard information, and OPUflex RCOH processing method 100 also initializes the RSZ_INFO to DEFAULT values to indicate that the connection is resizable or INVALID if it's not a resizable ODUflex (for instance ODUflex(CBR)), i.e. initial insertion of the resizability information.

The OPUflex RCOH processing method 100 generates OPUflex RCOH to be inserted into the OPUflex overhead 20 and initializes the RSZ_INFO(FREE_TS) to DEFAULT (step 104). The OPUflex RCOH processing method 100 checks if the OPUflex (i.e., GFP based) is resizable (step 106), and if not, the OPUflex RCOH processing method 100 sets the RSZ_INFO(FREE_TS) to INVALID and the RSZ_INFO(CUR_TS) to INVALID to indicate no resize support (step 108). The OPUflex is resizable based on the descriptions herein with respect to G.HAO. If the OPUflex is resizable (step 106), the OPUflex RCOH processing method 100 sets RSZ_INFO(CUR_TS) equal to N where N×TS is the ODUflex rate (step 110). This is used at subsequent network elements to check for symmetry. Finally, the OPUflex RCOH processing method 100 waits to receive the OPUflex from the opposite direction (step 112).

Figure 6:
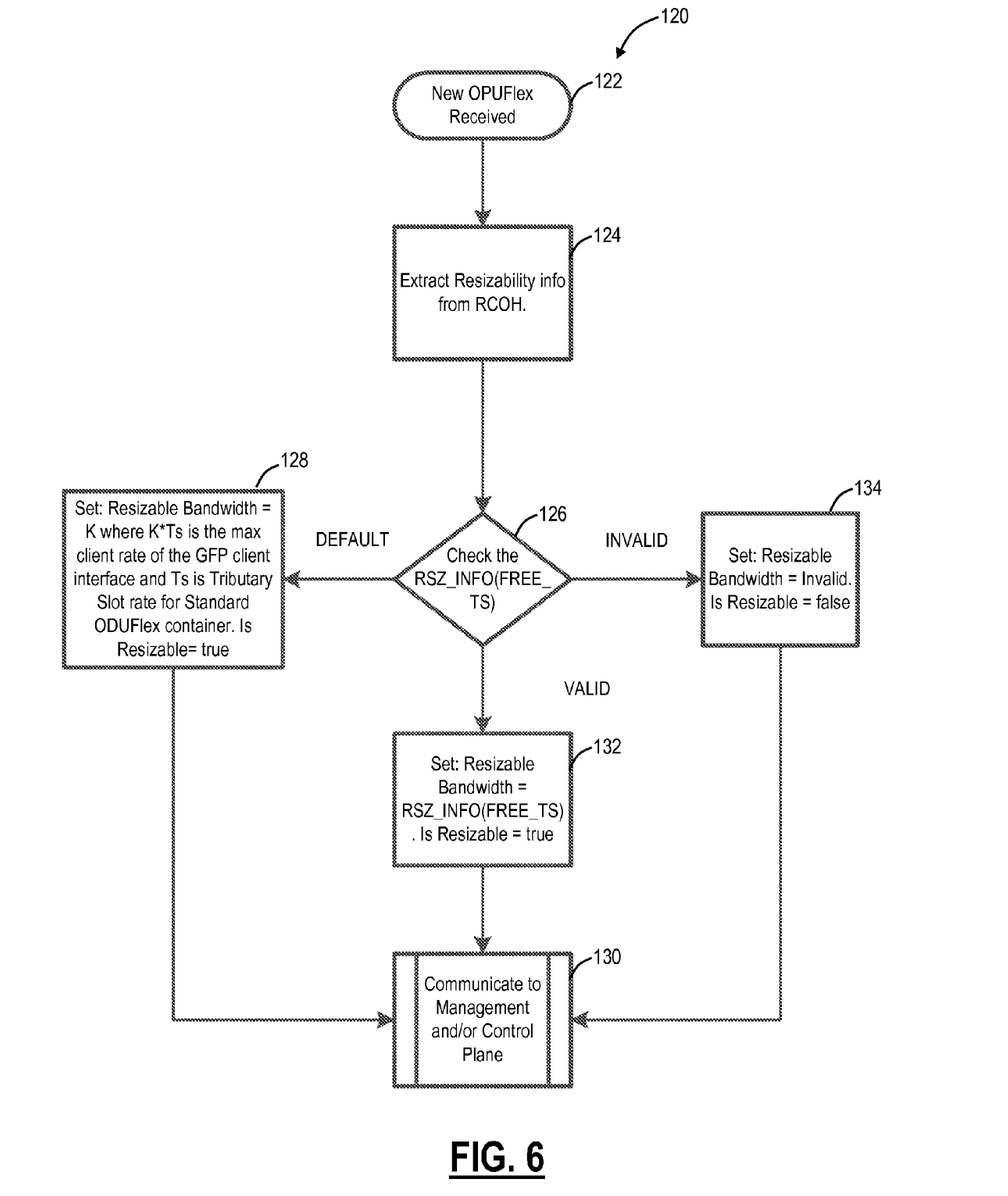
FIG. 6 is a flowchart of an OPUflex resizability processing method at client source/sink network elements for receiving a new ODUflex connection.

Referring to FIG. 6, in an exemplary embodiment, a flowchart illustrates an OPUflex RCOH processing method 120 at client source/sink network elements for receiving a new ODUflex connection. The OPUflex RCOH processing method 120 contemplates operation at the network elements 12, such as at the network element 12a for the ODUflex connection 16. OPUflex RCOH processing method 120 starts when a new OPUflex is received (step 122). The resizability information is extracted from the RCOH overhead 22 and the RSZ_INFO(FREE_TS) evaluated. The OPUflex RCOH processing method 120 checks the RSZ_INFO(FREE_TS) (step 126).

If the RSZ_INFO(FREE_TS) is DEFAULT (step 126), the OPUflex RCOH processing method 120 initializes the resizable bandwidth to K where K×TS is the maximum rate of the GFP client and is resizable is set to true since there is no intervening ODUk(HO) link constraining available resizing bandwidth in the ODUflex path (step 128). The OPUflex RCOH processing method 120 communicates the same to the management and/or control plane (step 130). If the RSZ_INFO(FREE_TS) is VALID (step 126), the OPUflex RCOH processing method 120 sets the resizable bandwidth to RSZ_INFO(FREE_TS) and is resizable is set to true (step 132) and communicates the same to the management and/or control plane (step 130). If the RSZ_INFO(FREE_TS) is INVALID (step 126), the OPUflex RCOH processing method 120 sets the resizable bandwidth to INVALID and is resizable is set to false (step 134) and communicates the same to the management and/or control plane (step 130).

OPUflex RCOH Processing on ODUk PT 21 Link

Figure 7:
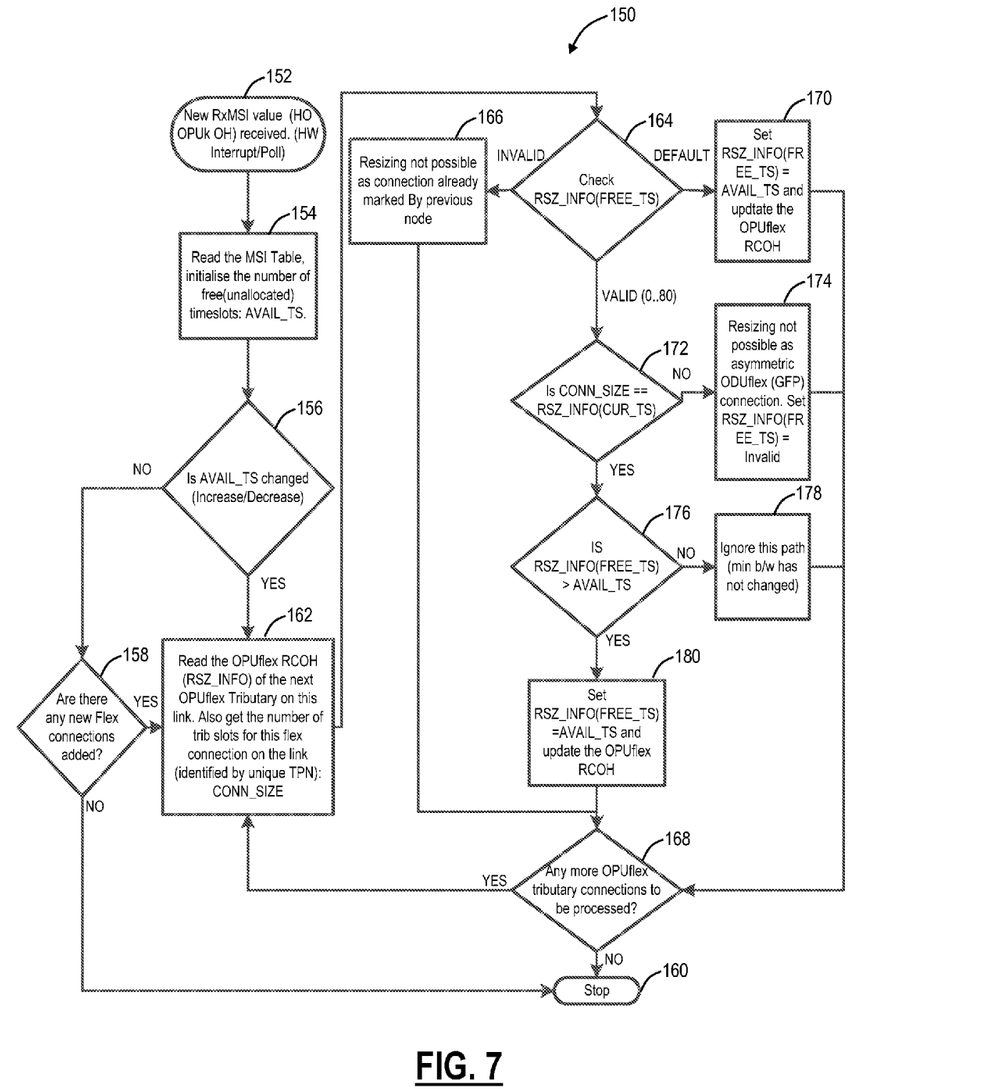
FIG. 7 is a flowchart of an OPUflex resizability processing method on an ODUk PT 21 link.

Referring to FIG. 7, in an exemplary embodiment, a flowchart illustrates an OPUflex RCOH processing method 150 on an ODUk PT 21 link. The OPUflex RCOH processing method 150 contemplates operation at the network elements 12, such as at the network elements 12b, 12c, 12d, 12e for the ODUflex connection 16. The OPUflex RCOH processing method 150 describes updating of the RCOH overhead 22 at the ODUk PT21 link endpoint. The OPUflex RCOH processing method 150 includes receiving a new Rx MSI value in the HO OPUk overhead and triggering a hardware interrupt or software poll (step 152). The OPUflex RCOH processing method 150 reads the MSI table and initializes the number of free (unallocated) TSs—AVAIL_TS (step 154). The OPUflex RCOH processing method 150 checks if the AVAIL_TS has changed (increased or decreased) (step 156).

If the AVAIL_TS has not changed (step 156) and if there are no new flex connections added (step 158), the OPUflex RCOH processing method 150 ends (step 160). If the AVAIL_TS has changed (step 156) or if there are new flex connections added (step 158), the OPUflex RCOH processing method 150 reads the OPUflex RCOH (RSZ_INFO) of the next OPUflex tributary on this link and also gets the number of tributary slots for this flex connection on the link (identified by unique TPN): CONN_SIZE (step 162). The OPUflex RCOH processing method 150 checks a state of RSZ_INFO(FREE_TS)–INVALID, DEFAULT, or VALID (e.g., set to 0 to 80, etc.). If the RSZ_INFO(FREE_TS) is INVALID (step 164), resizing is not possible as the connection has already been marked as such by a previous node (step 166), and the OPUflex RCOH processing method 150 checks if there are any more OPUflex tributary connections to be processed (step 168), and if not, the OPUflex RCOH processing method 150 ends (step 160) or if so, returns to the step 162.

If the RSZ_INFO(FREE_TS) is DEFAULT (step 164), the OPUflex RCOH processing method 150 sets the RSZ_INFO(FREE_TS)=AVAIL_TS and updates the OPUflex RCOH as such (step 170) and goes to the step 168. If the RSZ_INFO(FREE_TS) is VALID (step 164), the RSZ_INFO(FREE_TS) will have some value indicative of a number of free TSs. The OPUflex RCOH processing method 150 checks if the CONN_SIZE is the same as RSZ_INFO (CUR_TS) (step 172). This is to make sure the connection is symmetric, and if not, resizing is not possible in an asymmetric ODUflex (GFP) connection and the OPUflex RCOH processing method 150 sets RSZ_INFO(FREE_TS) to INVALID (step 174). If the connection is symmetric (step 172), the OPUflex RCOH processing method 150 checks if RSZ_INFO(FREE_TS) is greater than AVAIL_TS (step 176), and if so, ignores this path as the available bandwidth for resizing has not decreased (step 178) and goes to the step 168. If the available bandwidth has decreased (step 176), the OPUflex RCOH processing method 150 sets RSZ_INFO (FREE_TS)=AVAIL_TS and updates the OPUflex RCOH (step 180) and goes to the step 168.

The trigger for OPUflex RCOH update on the ODUk PT21 link is typically a hardware interrupt or a software poll. Whenever a change in MSI is detected, two possibilities for OPUflex RCOH update arise: 1. The number of free (unallocated) timeslots on the link (as indicated by Rx MSI) change: In this case, recycle through all the distinct ODUflex connections on the link and update the corresponding OPUflex RCOHs for the RSZ_INFO; or 2. There is no change in free timeslots but new ODUflex connection(s) are added accompanied by a delete of another connection such that there is no net increase/decrease of free timeslots: In this case, initialize the RSZ_INFO of only the newly added ODUflex connection(s) while leaving the existing ODUflex connections Exemplary Network Element Referring to FIG. 8, in an exemplary embodiment, a block diagram illustrates an exemplary network element 12 for use with the systems and methods described herein. In an exemplary embodiment, the exemplary network element 12 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the network element 12 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 12 can be any digital system with ingress and egress digital signals and switching of channels, timeslots, tributary units, etc. While the network element 12 is generally shown as an optical network element, the systems and methods contemplated for use with any switching fabric, network element, or network based thereon.

Figure 8:
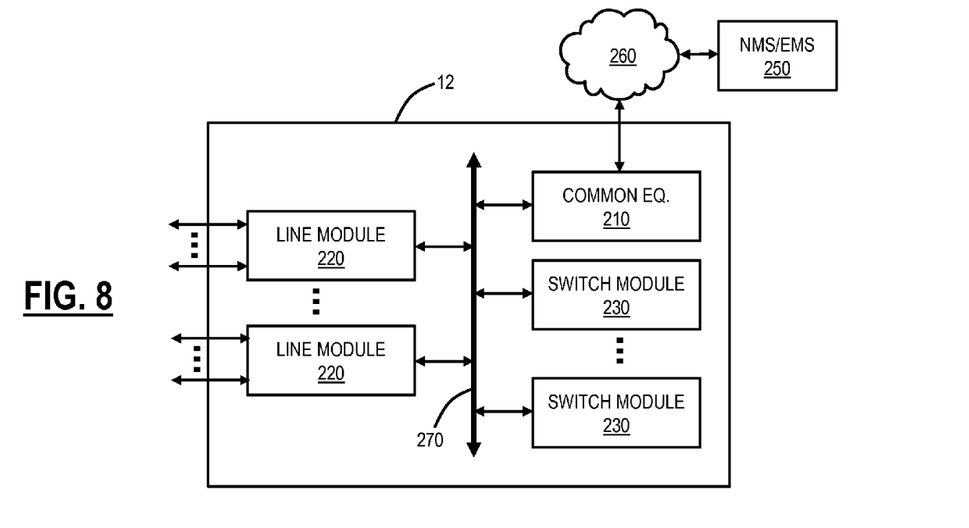
FIG. 8 is a block diagram of an exemplary network element for use with the systems and methods described herein.

In an exemplary embodiment, the network element 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 9, configured to operate the control plane as described herein. The network element 12 can include an interface 270 for communicatively coupling the common equipment 210, the line modules 220, and the switch modules 230 together. For example, the interface 270 can be a backplane, mid-plane, a bus, optical or electrical connectors, or the like. The line modules 220 are configured to provide ingress and egress to the switch modules 230 and to external connections on the links to/from the network element 12. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 220 can include wavelength division multiplexing interfaces, short reach interfaces, and the like, and can connect to other line modules 220 on remote network elements, end clients, edge routers, and the like, e.g. forming connections on the links. From a logical perspective, the line modules 220 provide ingress and egress ports to the network element 12, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and include ODUflex connections.

Those of ordinary skill in the art will recognize the network element 12 can include other components which are omitted for illustration purposes, and that the systems and methods described herein are contemplated for use with a plurality of different network elements with the network element 12 presented as an exemplary type of network element. For example, in another exemplary embodiment, the network element 12 may not include the switch modules 230, but rather have the corresponding functionality in the line modules 220 (or some equivalent) in a distributed fashion. For the network element 12, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 12 is merely presented as one exemplary network element 12 for the systems and methods described herein.

Exemplary Controller

Figure 9:
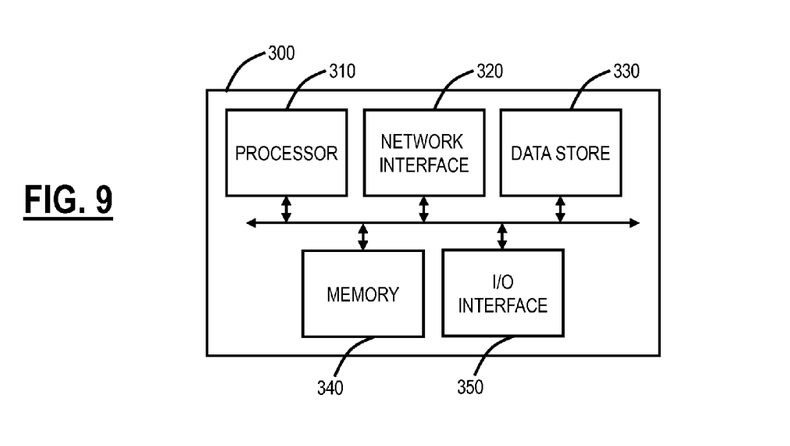
FIG. 9 is a block diagram of a controller to provide control plane processing and/or operations, administration, maintenance, and provisioning (OAM&P) for the network element of FIG. 7.

Referring to FIG. 9, in an exemplary embodiment, a block diagram illustrates a controller 300 to provide control plane processing and/or operations, administration, maintenance, and provisioning (OAM&P) for the network element 12. The controller 300 can be configured to perform the various techniques described herein to update and monitor the RCOH overhead 22. The controller 300 can be part of common equipment, such as common equipment 210 in the network element 12, or a stand-alone device communicatively coupled to the network element 12 via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an I/O interface 350, and the like, all of which are communicatively coupled together and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 10 to operate the control plane for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For exampl, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane in the network 10. That is, the controller 300 is configured to implement software, processes, algorithms, etc. that control configurable features of the network 10, such as automating discovery of the network elements 12, capacity on the links, port availability on the network elements 12, connectivity between ports; dissemination of topology and bandwidth information between the network elements 12; path computation and creation for connections; network level protection and restoration; and the like. As part of these functions, the controller 300 can include a topology database that maintains the current topology of the network 10 based on control plane signaling (e.g., HELLO messages) and a connection database that maintains available bandwidth on the links again based on the control plane signaling. Again, the control plane is a distributed control plane; thus a plurality of the controllers 300 can act together to operate the control plane using the control plane signaling to maintain database synchronization. In source-based routing, the controller 300 at a source node for a connection is responsible for path computation and establishing by signaling other controllers 300 in the network 10. For example, the source node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the networks elements 12 from the originating node to the destination node based on a plurality of constraints such as administrative weights on the links, bandwidth availability on the links, etc.

The systems and methods described herein are independent with respect to flex resizing mechanisms, e.g., the systems and methods can utilize G.HAO, any future standardized methods, or any proprietary resizing methods. Also, the systems and methods can use any fields in the overhead in case framer devices do not support extraction/insertion of RCOH (due to proprietary implementation of Flex resizing), for example 254 bytes+7 bits of PSI are reserved in GFP mapped OPU client OH. That is, the systems and methods can make use of any of available path end-to-end bytes to propagate RSZ_INFO(FREE_TS) and RSZ_INFO(CUR_TS) while the algorithm remains the same.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, in a network element, for detecting and propagating resizability information of an Optical channel Data Unit flex (ODUflex) connection, the method comprising:

receiving resizability information in reserved bits of Resize Control Overhead (RCOH) associated with the ODUflex connection for advertisement thereof, wherein the reserved bits are designated for future standardization, wherein the resizability information in the reserved bits of the RCOH includes a number of available tributary slots and whether the ODUflex connection is resizable because it is symmetric;

adjusting the resizability information based on a change in the number of available tributary slots, due to a bandwidth change at the network element; and transmitting the adjusted resizability information in the RCOH such that the adjusted resizability information is available in real time as the bandwidth change to client endpoint network elements.

2. The method of claim 1, wherein the resizability information is monitored, at a client endpoint, to determine how much and whether the ODUflex connection can resize.

3. The method of claim 1, wherein the number of available tributary slots is a lowest number of available tributary slots along a path of the ODUflex connection.

4. The method of claim 1, wherein the resizability information indicates a number of tributary slots supported at the network element and preceding network elements, and wherein subsequent network elements determine if the ODUflex connection has an equal or greater number of tributary slots, and, if not, the resizability information is adjusted accordingly.

5. The method of claim 1, wherein the resizability information is set to DEFAULT at an originating network element for the ODUflex connection, VALID with the number of available tributary slots set at subsequent network elements to a minimum of available bandwidth over all network elements in which the ODUflex connection traverses, or INVALID when the ODUflex connection is not resizable.

6. The method of claim 1, further comprising:
checking the resizability information to determine if the number of available time slots from a preceding network element is greater than a number of tributary slots available locally at the network element, and if so, changing the resizability information to reflect the lower number of available tributary slots available locally; and
checking if the ODUflex connection is resizable, and if not, changing the resizability information to reflect that the ODUflex connection is not resizable.

7. The method of claim 1, further comprising:
updating the resizability information whenever any link at the network element associated with the ODUflex connection has a change in bandwidth.

8. The method of claim 1, wherein, at a client endpoint of the ODUflex connection, a hitless increase of the ODUflex connection is allowed or disallowed based on the resizability information.

9. A network element, comprising:
at least one port with a High Order (HO) Optical channel Data Unit (ODU) with an ODUflex connection thereon; and
a controller configured to:
if the network element is an endpoint to the ODUflex connection, set resizability information in reserved bits of Resize Control Overhead (RCOH) of the ODUflex connection to a default value for advertisement thereof, wherein the reserved bits are designated for future standardization, wherein the resizability information in the reserved bits of the RCOH includes a number of available tributary slots and whether the ODUflex connection is resizable because it is symmetric, and wherein the resizability information is adjusted in real time with any changes to the number of available tributary slots; and
if the network element is an intermediate point for the ODUflex connection, read the resizability information in the overhead and adjust its values based on local information related to the number of available tributary slots and whether the ODUflex connection is resizable, wherein a change in the adjusted resizability information is available in real time with the changes to the number of available tributary slots.

10. A network, comprising:
a plurality of network elements;
a plurality of links interconnecting the network elements; and
at least one Optical channel Data Unit flex (ODUflex) connection on a path over links between two endpoints of the plurality of network elements;
wherein resizability information is included in reserved bits of Resize Control Overhead (RCOH) associated with the ODUflex connection for advertisement thereof, wherein the reserved bits are designated for future standardization;
wherein the resizability information in the reserved bits of the RCOH includes a number of available tributary slots for resizing and whether the ODUflex connection is resizable because it is symmetric; and
wherein the resizability information is adjusted based on a change of the bandwidth available on the ODUflex connection path concurrently with a change of a connection map on any link along the path such that the adjusted resizability information is available in real time with the change to any client endpoint network element.

11. The network of claim 10, further comprising:
a control plane;
wherein the resizability information is communicated through the RCOH associated with the ODUflex is communicated to the control plane.

12. The network of claim 10, wherein the resizability information is set to DEFAULT at an originating network element for the ODUflex connection, VALID with the number of available tributary slots set at subsequent network elements to a minimum of all links in the path, or INVALID when the ODUflex connection is not resizable.

13. The network of claim 10, wherein the hitless adjustment utilizes G.7044/Y.1347 (10/11) "Hitless adjustment of ODUflex (GFP)" (G.HAO), and wherein the ODUflex connection supports the hitless adjustment if the ODUflex connection has an equal number of tributary slots on all links.

* * * * *